US007098056B2

(12) United States Patent
Demers (10) Patent No.: US 7,098,056 B2
(45) Date of Patent: Aug. 29, 2006

(54) APPARATUS, MATERIALS, AND METHODS FOR FABRICATION AND CATALYSIS

(75) Inventor: Linette Demers, Evanston, IL (US)

(73) Assignee: Nanoink, Inc., Chicago, IL (US)

( * ) Notice: Subject to any disclaimer, the term of this patent is extended or adjusted under 35 U.S.C. 154(b) by 417 days.

(21) Appl. No.: 10/637,641

(22) Filed: Aug. 11, 2003

(65) Prior Publication Data

US 2004/0101469 A1 May 27, 2004

Related U.S. Application Data

(60) Provisional application No. 60/402,037, filed on Aug. 9, 2002.

(51) Int. Cl.
*H01L 21/00* (2006.01)

(52) U.S. Cl. .................. 438/20; 438/800; 977/857

(58) Field of Classification Search .................. 438/20, 438/800
See application file for complete search history.

(56) References Cited

U.S. PATENT DOCUMENTS

| | | | |
|---|---|---|---|
| 5,298,760 A * | 3/1994 | Fuchs et al. ............. | 250/492.3 |
| 6,146,227 A | 11/2000 | Mancevski | |
| 6,183,714 B1 | 2/2001 | Smalley et al. | |
| 6,277,318 B1 | 8/2001 | Bower et al. | |
| 6,333,016 B1 | 12/2001 | Resasco et al. | |
| 6,346,189 B1 | 2/2002 | Dai et al. | |
| 6,635,311 B1 | 10/2003 | Mirkin | |
| 6,642,129 B1 | 11/2003 | Liu et al. | |
| 6,755,956 B1 | 6/2004 | Lee et al. | |
| 6,781,166 B1 | 8/2004 | Lieber et al. | |
| 6,827,979 B1 | 12/2004 | Mirkin | |
| 6,831,017 B1 * | 12/2004 | Li et al. ..................... | 438/694 |
| 6,837,928 B1 * | 1/2005 | Zhang et al. ............... | 117/95 |
| 2002/0088938 A1 | 7/2002 | Colbert et al. | |
| 2002/0102203 A1 | 8/2002 | Smalley et al. | |
| 2002/0113714 A1 | 8/2002 | Smalley et al. | |
| 2002/0127336 A1 | 9/2002 | Chen et al. | |
| 2002/0178846 A1 * | 12/2002 | Dai et al. .................. | 73/866.5 |
| 2003/0049444 A1 * | 3/2003 | Dai et al. .................. | 428/367 |
| 2003/0068446 A1 | 4/2003 | Mirkin et al. | |
| 2003/0143327 A1 | 7/2003 | Rudiger et al. | |
| 2003/0148577 A1 | 8/2003 | Merkulov et al. | |
| 2003/0162004 A1 | 8/2003 | Mirkin | |
| 2004/0026007 A1 * | 2/2004 | Hubert et al. ............. | 156/64 |
| 2004/0101469 A1 * | 5/2004 | Demers ..................... | 423/447.3 |

OTHER PUBLICATIONS

U.S Appl. No. 10/442,189, filed May 21, 2003, Mirkin et al.
Cao, A., et al., "Synthesis of well-aligned carbon nanotube network on a gold-patterned quartz substrate", Applied Surface Science, vol. 181, pp. 234-238 (2001).
Cassell, A. M., et al., "Directed Growth of Free-Standing Single-Walled Carbon Nanotubes", J. Am. Chem. Soc., vol. 121, pp. 7975-7976 (1999).
Cassell, A. M., et al., "Large Scale CVD Synthesis of single-Walled Carbon Nanotubes", J. Phys. Chem. B, vol. 103, pp. 6484-6492 (1999).

(Continued)

*Primary Examiner*—Evan Pert
(74) *Attorney, Agent, or Firm*—Foley & Lardner LLP (57) ABSTRACT

A method for producing carbon nanotubes, the method comprising: (a) providing a substrate with a top surface, (b) forming an island of catalyst material on the top surface using a tip having a patterning compound thereon, (c) heating the substrate and catalyst island, and (d) contacting the catalyst island with a carbon-containing gas for a period of time sufficient to form the nanotubes on the catalyst island.

37 Claims, 5 Drawing Sheets

OTHER PUBLICATIONS

Cheung, C. L., et al., "Carbon nanotube atomic force microscopy tips: Direct growth by chemical vapor deposition and application to high-resolution imaging", PNAS, vol. 97, No. 8, pp. 3809-3813 (2000).

Choi, H. C., "Delivery of Catalytic Metal Species onto Surfaces with Dendrimer Carriers for the Synthesis of Carbon Nanotubes with Narrow Diameter Distribution", J. of Phys. Chem. B, vol. 106, no. 48, pp. 12361-12365 (2002).

Cooper, E. B., et al., "Terabit-per-square-inch data storage with the atomic force microscope", Appl. Phys. Lett., vol. 75, No. 22, pp. 3566-3568 (1999).

Dai, H., "Controlling nanotube growth", Physics World, vol. 13, No. 6, pp. 43-48 (2000).

Dai, H., et al., "Nanotube Growth and Characterization", chapter in book "Topics in Applied Physics", vol. 80, Ed. M. Dresselhaus, Springer Verlag (2000).

de Heer, W. A., et al., "Industry sizes up nanotubes", Physics World, vol. 13, No. 6, pp. 49-53 (2000).

Demers, L., et al., "Combinational Templates Generated by Dip-Pen Nanolithography for the Formation of Two-Dimensional Particle Arrays", Angew. Chem. Int. Ed., vol. 40, No. 16, pp. 3069-3071 (2001).

Demers, L., et al., "Orthogonal Assembly of Nanoparticle Building Blocks on Dip-Pen Nanolithographically Generated Templates of DNA", Angew. Chem. Int. Ed., vol. 40, No. 16, pp. 3071-3073 (2001).

Fan, S., et al., "Self-Oriented Regular Arrays of Carbon Nanotubes and Their Field Emission Properties", Science, vol. 283, pp. 512-514 (1999).

Hafner, J. H., et al., "Direct Growth of Single-Walled Carbon nanotube Scanning Probe Microscopy Tips", J. Am. Chem. Soc., vol. 121, pp. 9750-9751 (1999).

Ivanisevic, A. et al., "Redox-Controlled Orthogonal Assembly of Charged Nanostructures", J. Am. Chem. Soc., vol. 123, pp. 12424-12425 (2001).

Jamieson, V., "Carbon nanotubes roll on", Physics World, vol. 13, No. 6, p. 29 (2000).

Kind, H., et al., "Patterned Films of Nanotubes Using Microcontact Printing of Catalysts", Adv. Mater., vol. 11, No. 15, pp. 1285-1289 (1999).

Kong, J., et al., "Synthesis of individual single-walled carbon nanotubes on patterned silicon wafers", Nature, vol. 395, pp. 878-881 (1998).

Li, Y., et al., "Electrochemical AFM 'Dip-Pen' Nanolithography", J. Am. Chem. Soc. vol. 123, pp. 2105-2106 (2001).

Li, Y., et al., "Growth of Single-Walled Carbon Nanotubes from Discrete Catalytic Nanoparticles of Various Sizes", J. Phys. Chem. B., vol. 105, pp. 11424-11431 (2001).

Li, Y., et al., "Preparation of Monodispersed Fe-Mo Nanoparticles as the Catalyst for CVD Synthesis of carbon Nanotubes", Chem. Mater. vol. 13, pp. 1008-1014 (2001).

Liu, X., et al., "Arrays of Magnetic Nanoparticles Patterned via 'Dip-Pen' Nanolithography", Adv. Mater., vol. 14, No. 3, pp. 231-234 (2002).

Madou, M. J., "Fundamentals of Microfabrication, The Science of Miniaturization" $2^{nd}$ Ed., pp. 454-455 (2002).

Maynor, B. W., et al., "AU 'Ink' for AFM 'Dip-Pen' Nanolithography", Langmuir, vol. 17, pp. 2575-2578 (2001).

Maynor, B. W., et al., "Direct-Writing of Polymer Nanostructures: Poly(thiophene) Nanowires on Semiconducting and Insulating Surfaces", J. Am. Chem. Soc., vol. 124, No. 4, pp. 522-523 (2002).

McEuen, P. L., "Single-wall carbon nanotubes", Physics World, vol. 13, No. 6, pp. 31-36 (2000).

McKendry, R., "Creating Nanoscale Patterns of Dendrimers on Silicon Surfaces with Dip-Pen Nanolithography", Nano Letts., vol. 2. no. 7, pp. 713-716 (2002).

Mirkin, C.A., et al., "Dip-Pen Nanolithography: Direct Writing Soft Structures on the Sub-100-Nanometer-Length Scale", Direct-Write Technologies for Rapid Prototyping Applications: Sensors, Electronics, and Integrated Power Sources, Academic Press, Chpt. 10 pp. 303-312 (2002).

Piner, R. D., et al., "'Dip-Pen' Nanolithography", *Science*, vol. 283, p. 661-663 (1999).

Porter, L.A., Jr., et al., "Electroless Nanoparticle Film Deposition Compatible with Photolithography, Microcontact Printing, and Dip-Pen Nanolithography Patterning Technologies", Nano Letters, vol. 2, No. 12, pp. 1369-1372 (2002).

Schönenberger, C., et al., "Multiwall carbon nanotubes", Physics World, vol. 13, No. 6, pp. 37-42 (2000).

Soh, H. T., et al., "Integrated nanotube circuits: Controlled growth and ohmic contacting of single-walled carbon nanotubes", Appl. Phys. Lett., vol. 75, No. 5, pp. 627-629 (1999).

Su, Ming, et al., "Moving beyond Molecules: Patterning Solid-State Features via Dip-Pen Nanolithography with Sol-Based Inks", J. Am. Chem. Soc., vol. 124, No. 8, p. 1560-1561 (2002).

Wang, H., et al., "Controlled synthesis of aligned carbon nanotube arrays on catalyst patterned silicon substrates by plasma-enhanced chemical vapor deposition", Applied Surface Science, vol. 181, pp. 248-254 (2001).

Wei, Y. Y., et al., "Directed assembly of carbon nanotube electronic circuits by selective area chemical vapor deposition on prepatterned catalyst electrode structures", J. Vac. Sci. Technol. B, vol. 18, No. 6, pp. 3586-3589 (2000).

Zhang, M., et al., "A MEMS nanoplotter with high-density parallel dip-pen nanolithography probe arrays", Institute of Physics Publishing, vol. 13, pp. 212-217 (2002).

Zheng, B., et al., "Efficient CVD Growth of Single-Walled Carbon Nanotubes on Surfaces Using Carbon Monoxide Precursor", Nano Lett., vol. 2, No. 8, pp. 895-898 (2002).

* cited by examiner

APPARATUS, MATERIALS, AND METHODS FOR FABRICATION AND CATALYSIS

RELATED APPLICATIONS

This application claims priority to provisional application serial No. 60/402037 filed Aug. 9, 2003 (inventor: Linette Demers), which is hereby incorporated by reference in its entirety.

BACKGROUND

New forms of carbon including carbon nanotubes have commercially attractive properties. Better, more commercially attractive methods are needed to produce such materials for nanotechnological advancement. In addition, better methods are needed to provide purer materials and to locate materials in existing structures. Location is vital, for example, to building nanoelectronic and nanooptical devices. Also, better methods are needed to produce single wall carbon nanotubes. Nanolithography provides a commercially attractive route to improve carbon nanotube technology and provide high resolution and high alignment capabilities.

SUMMARY

One embodiment of the present invention is a method for producing carbon nanotubes, the method comprising:
   a) providing a substrate with a top surface,
   b) forming an island of catalyst material on the top surface using a tip having a patterning compound thereon,
   c) heating the substrate and catalyst island, and
   d) contacting the catalyst island with a carbon-containing gas for a period of time sufficient to form the nanotubes on the catalyst island. The tip can be a scanning probe microscopic tip including an atomic force microscopic tip. The island can have a length or width dimension other than height which is less than about one micron in size. The island can be a dot or line. The substrate top surface can be also passivated.

The invention also provides a method for producing carbon nanotubes comprising the steps of:
   a) providing an ink-coated AFM tip, wherein the ink comprises a catalyst for carbon nanotube growth;
   b) forming a pattern of catalyst on the top surface of a substrate with use of direct-write nanolithography using the ink-coated AFM tip, wherein the pattern is characterized by a size dimension other than height which is less than about one micron; and
   c) contacting the catalyst with a carbon-containing gas under conditions sufficient to form the carbon nanotubes on the catalyst. The dimension can be less than about 100 nm. The catalyst can be a nanoparticle, including a metallic or metallic oxide nanoparticle. The pattern can comprise an array of dots or lines.

The invention also provides a method for producing carbon nanotubes comprising the steps of:
   a) providing an ink-coated AFM tip, wherein the ink comprises a catalyst precursor for carbon nanotube growth;
   b) forming a pattern of catalyst precursor on the top surface of a substrate with use of direct-write nanolithography using the ink-coated AFM tip, wherein the pattern is characterized by a size dimension other than height which is less than about one micron;
   c) converting the catalyst precursor to catalyst;
   d) contacting the catalyst with a carbon-containing gas under conditions sufficient to form the carbon nanotubes on the catalyst. The catalyst can be a metal or metal oxide. The dimension can be about 100 nm or less. The catalyst can be a metal or metal oxide and the dimension can be about 100 nm or less. The catalyst precursor can comprise a dendrimer or a protein.

The invention also provides a method for producing carbon nanotubes comprising the steps of:
   a) providing an ink-coated AFM tip,
   b) forming a template pattern on the top surface of a substrate with use of direct-write nanolithography using the ink-coated AFM tip, wherein the pattern is characterized by a size dimension other than height which is less than about one micron;
   c) binding carbon nanotube catalyst to the pattern;
   d) contacting the catalyst with a carbon-containing gas under conditions sufficient to form the carbon nanotubes on the catalyst.

The invention also provides a method for producing carbon nanotubes comprising the steps of:
   a) providing an ink-coated AFM tip,
   b) forming a template pattern on the top surface of a substrate with use of direct-write nanolithography using the ink-coated AFM tip, wherein the pattern is characterized by a size dimension other than height which is less than one micron;
   c) binding carbon nanotube catalyst precursor to the pattern;
   d) converting the catalyst precursor to a catalyst;
   e) contacting the catalyst with a carbon-containing gas under conditions sufficient to form the carbon nanotubes on the catalyst.

The invention also provides a method for producing nanotubes or nanowires consisting essentially of the steps of:
   a) forming a catalyst pattern on the top surface of a substrate with use of direct-write nanolithgraphic printing without use of a resist or a stamp and a scanning probe microscope tip having a patterning ink thereon, wherein the catalyst is bonded to the substrate, and
   b) contacting the catalyst with a gas under conditions sufficient to form the nanotubes or nanowires on the catalyst, wherein the catalyst pattern is characterized by a size dimension other than height which is less than about 500 nm. The nanotubes or nanowires can consist essentially of carbon. The catalyst can be formed directly on the surface without use of a precursor. Or, the catalyst can be formed indirectly on the surface with use of a precursor ink which is converted to catalyst after patterning.

The invention also comprises articles and devices produced by the methods of the invention, and methods of using the articles and devices. Microelectronic and optical devices, including logic elements, transistors and other semiconductor devices, are particularly of importance. Devices comprising nanoscopic functional elements are also important.

DETAILED DESCRIPTION

This application claims priority to provisional application serial No. 60/402037 filed Aug. 9, 2003 ("Apparatus, Materials, and Methods for Fabrication and Catalysis"; inventor: Linette Demers), which is hereby incorporated by reference in its entirety.

Direct-write technologies can be carried out by methods describe in, for example, *Direct-Write Technologies for Rapid Prototyping Applications: Sensors, Electronics, and Integrated Power Sources*, Ed. by A. Pique and D. B. Chrisey, Academic Press, 2002. Chapter 10 by Mirkin, Demers, and Hong, for example, describes nanolithographic printing at the sub-100 nanometer length scale, and is hereby incorporated by reference (pages 303–312). Pages 311–312 provide additional references on scanning probe lithography and direct-write methods using patterning compounds delivered to substrates from nanoscopic tips which can guide one skilled in the art in the practice of the present invention.

Direct-write nanolithography, in addition, has been described in the following documents which are each hereby incorporated by reference in their entirety and form part of the present disclosure.

(1) Piner et al. *Science*, 29 Jan. 1999, Vol. 283 pgs. 661–663.
(2) U.S. Provisional application 60/115,133 filed Jan. 7, 1999.
(3) U.S. Provisional application 60/207,713 filed Oct. 4, 1999.
(4) U.S. Regular patent application Ser. No. 09/477,997 filed Jan. 5, 2000.
(5) U.S. Provisional application 60/207,713 filed May 26, 2000.
(6) U.S. Provisional application 60/207,711 filed May 26, 2000.
(7) U.S. Regular application Ser. No. 09/866,533 filed May 24, 2001.
(8) U.S. patent publication No. 2002/0063212 A1 published May 30, 2002.
(9) U.S. Provisional application 60/341,614 filed Dec. 17, 2001.
(10) U.S. Regular application Ser. No. 10/320,721 filed Dec. 17, 2002.
(11) M. Su et al., *J. Am. Chem. Soc.*, vol. 124, No. 8, pages 1560–1561, 2002.
(12) Demers et al. *Angew Chem. Int. Ed. Engl.* 2001, 40(16), 3069–3071.
(13) Demers et al. *Angew Chem. Int. Ed. Engl.* 2001, 40(16), 3071–3073.
(14) Liu et al. *Adv. Mater.* 2002, 14, No. 3, Feb. 5, 231–234.
(15) B. W. Maynor et al., *Langmuir*, 2001, 17, 2575–2578.
(16) Li, Y. et al., *J. Am. Chem. Soc.*, 2001, Vol. 123, 2105–2106.
(17) Maynor et al., *J. Am. Chem. Soc.*, Vol. 124, No. 4, 522–523, 2002.
(18) L. A. Porter et al., *NanoLetters*, 2002, Vol. 2, No. 12, 1369–1372 (Au, Pd, and Pt nanoparticles from metal salt coated AFM tips)
(19) M. Zhang et al., *Nanotechnology*, 13 (2002), 212–217 (parallel DPN printing with array of microfabricated probes).
(20) A. Ivanisevic et al., *J. Am. Chem. Soc.*, 2001, 123, 12424–12425 (particle assembly with opposite charged species).
(21) U.S. Patent Publication 2003/0022470 published Jan. 30, 2003 to Liu et al. ("Parallel, individually addressable probes for nanolithography")
(22) U.S. Patent Publication No. 2003/00668446 ("Protein and peptide nanoarrays") published Apr. 10, 2003 to Mirkin et al.

DPN™ and DIP PEN NANOLITHOGRAPHY™ are trademarks of Nanoink, Inc. and are used accordingly herein. In the DPN™ printing process, an ink is transferred to a substrate from a tip. The transferred ink, if desired, can be used as a template for further fabrication. The advantages and applications for DPN™ printing are numerous and described in these references. DPN™ printing is an enabling nanofabrication/nanolithographic technology which allows one to practice fabrication and lithography at the nanometer level with exceptional control and versatility. The present invention enables the preparation of surfaces patterned with discrete catalyst materials at nanometer scale and nanometer resolution with facile control. DPN™ printing provides for fine control of the patterning which is not provided by other methods. However, DPN™ printing can also be automated which provides rapid production. Moreover, the structures produced by DPN™ printing are generally stable, as DPN™ printing allows for the catalysts to be covalently bonded or chemically adsorbed to the substrate rather than merely physically adsorbed or mechanically locked in. DPN™ printing does not require that the substrate surface be made porous to accept the catalyst in a mechanical lock. Rather, the strategically patterned catalyst materials, chemically bound at predefined locations by DPN™ printing, are then used for growing desired materials such as, for example, carbon nanotubes at the predefined locations on the substrate.

U.S. Patent Publication 2002/0063212, published May 30, 2002 to Mirkin et al., discloses many useful embodiments which are hereby incorporated by reference including, for example, use of tips (paragraphs 0052–0054); substrates (0055); patterning compounds (0056–0078); tip coating methods (0079–82); patterning (0083–88); alignment (0089); nanoplotter format (0090–0092); multiple patterning compounds (0093); other methods (0094–0095); resolution parameters (0096–0100); uses including arrays and detection methods (0101–0106); software (0107–0128); kits (0129); instruments (0130); and imaging methods (0130–0136). Seven working examples are provided (0137–0211), which are incorporated by reference in their entirety. An appendix related to computer software is also provided and incorporated by reference (0212–0264).

In addition, the Demers articles noted above as references 10 and 11 describe use of nanolithographically generated templates to control building structures with nanoparticles. Particle organizational strategies are also disclosed, and are incorporated by references for specific teachings concerning these topics.

The Su article noted above also describes production of nanolithographic patterns using sol-gel chemistry to form, for example, metal oxide structures.

This type of nanofabrication and nanolithography in particular can be difficult to achieve with many technologies that are more suitable for micron scale work.

Carbon nanotubes are described in Marc J. Madou's *Fundamentals of Microfabrication, The Science of Miniaturization*, $2^{nd}$ Ed., pages 454–455, including carbon nanotube preparation by CVD from patterned catalysts. This Madou text also describes microlithography and nanolithography, and the use of carbon nanotubes at tips of AFM and STM probes. Carbon nanotubes are also described in the text, *Carbon Nanotubes*, by Dresselhaus et al., Springer-Verlag, 2000. See also, Special-Section, "Carbon Nanotubes" *Physics World*, vol. 13, pp. 29–53, 2000. Carbon nanotubes can be single-walled carbon nanotubes (SWNTs), multi-walled carbon nanotubes (MWNTs), nanohorns, nanofibers, or nanotubes. They can be conducting or semiconducting depending on the form of the nanotube. They can be open, closed, and have different kinds of spiral structure. Uses include storing fuels such as hydrogen or methanol for use in fuel cells and as supports for catalysts. They can be in zigzag and armchair form and have varying steepness which alters the chiral form.

Chemical vapor deposition (CVD) is one method for carbon nanotube production. In the CVD method, a catalyst for carbon nanotube growth is disposed on a surface and exposed to a carbon source and reaction conditions which promote carbon nanotube growth at the catalyst site. If the catalyst is patterned onto the surface, the carbon nanotube growth can result in a pattern of carbon nanotubes reflected the catalyst pattern. Although carbon nanotubes can be considered a part of nanotechnology, generally they have been prepared using micron level patterning. A number of references are noted herein which can be used by one skilled in the art to practice the present invention and, for example, grow carbon nanotubes from a catalyst site. For example, U.S. Pat. No. 6,346,189 to Dai et al., which is incorporated by reference, discloses micron technology, wherein nanotube structures are grown on catalyst islands. There is, however, no expressed or implicit suggestion that these islands can be at a nanometer scale, on the order of less than one micron. Hence, this technology is limited in its ability to connect nanotube technology with nanotechnology.

In another example, the publication by Kind et al. (*Adv. Mater. Sci.* 1999, 11, 15, 1285–1289; incorporated herein by reference) also discloses nanotube production with use of microcontact printing at micron scale, not at nanometer scale. Again, these methods are not enabling for nanolithography or nanofabrication, particularly nanofabrication done at dimensions of 100 nm or less.

In addition, attempts to do nanofabrication and nanolithography can be cumbersome as reflected in the paper by Wang et al. (*Appl. Surf. Sci.*, 181 (2001), 248–254. Here, micropatterns, not nanopatterns, were formed by three methods including: (1) physical mask patterning using TEM grids, (2) electron beam lithography coupled with lift-off techniques, and (3) photolithography. Lines produced by electron beam lithography had a width of 10 microns, and at page 251, this paper states that the smallest width and space of self-oriented nanotube lines synthesized by our method are 2 microns. In sum, the goal of nanotechnology is miniaturization at the nanometer level, not the micron level, and DPN™ printing provides that miniaturization.

An important application of CVD preparation of nanotubes is the preparation of scanning probe microscopic tips, including AFM tips (see, for example, U.S. Pat. No. 6,346, 189 to Dai et al.), and the present invention also enables the efficient fabrication of carbon nanotube scanning probe microscopic (SPM) tips including atomic force microscope (AFM) tips. It is very difficult and expensive presently to fabricate carbon nanotube SPM tips, including AFM tips, without a precise method of positioning catalysts or nanotubes.

Other advantages of the present invention are many and include, for example: (1) flexibility in terms of length scale of pattern and the substrate for catalyst immobilization, (2) multiple types of catalyst particles can be patterned on the same substrate in high registration, and (3) patterning can be done in serial or in parallel with patterning probe arrays. These features provide an improved method of fabricating, for instance multiple SPM nanotube tip probes at once, instead of one-at-a-time.

Computer simulation can be used to understand and control the fabrication process according to the present invention.

Figure 1:
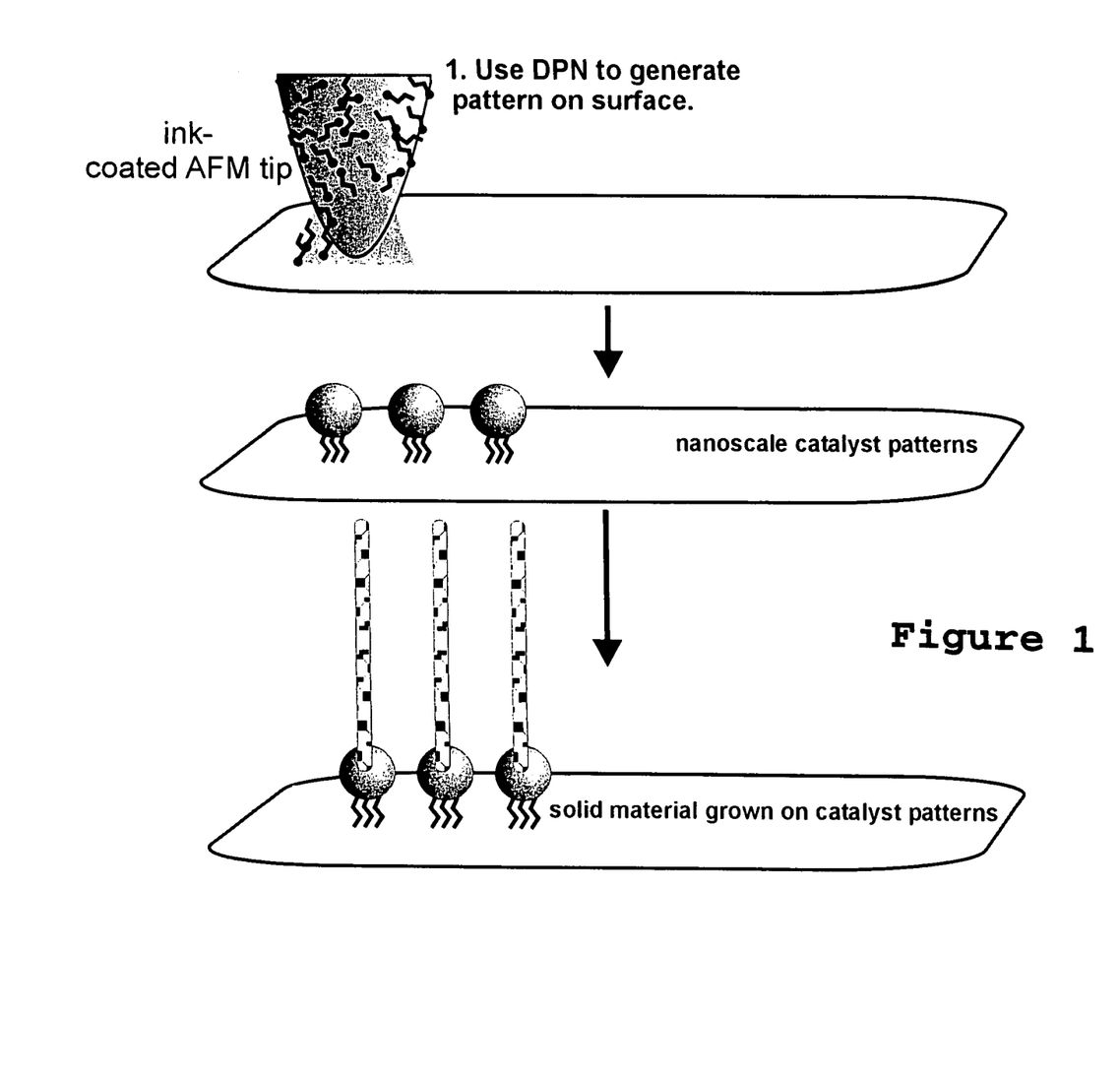
FIG. 1 illustrates an ink-coated AFM tip used to pattern a substrate surface by nanolithography.

The present invention is illustrated by a series of embodiments illustrated in FIGS. 1–5. In FIG. 1, for example, an ink-coated AFM tip is used to pattern a substrate surface by dip pen nanolithographic printing. This patterned surface is then converted to a surface with a corresponding nanoscale catalyst pattern. The catalyst pattern is then exposed to conditions for growth of a solid material such as a nanotube or a nanowire.

Figure 2:
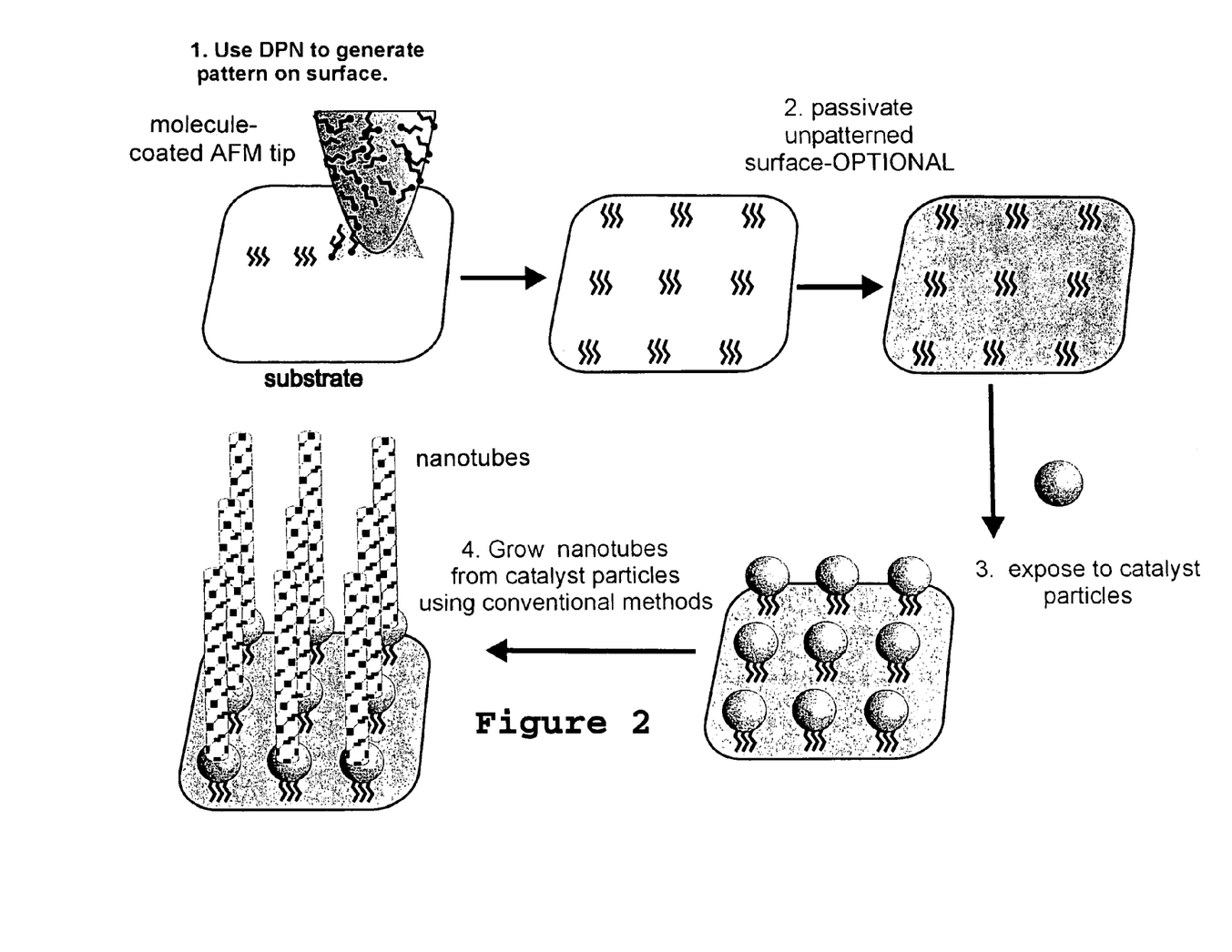
FIG. 2 illustrates an ink-coated AFM tip used to pattern a substrate surface by nanolithography including use of a template pattern.

In FIG. 2, a more detailed illustration is provided. First, a template pattern is generated on a surface by DPN printing. In forming a template, any patterning compound can be used provided it is capable of modifying the substrate to form stable surface structures. The template pattern can be formed on the substrate by dip pen nanolithographic printing methods, as described in the documents above. For example, arrays and patterns can be generated including those in the form of dots and/or lines. The patterns produced have lateral dimensions as large as many microns and as small as 10 nm. In an optional step, after pattern formation, the unpatterned part of the surface is passivated with another material. In the next step, the patterned surface is exposed to catalyst particles which results in the binding of catalyst particles to the template pattern to form a catalyst pattern. Binding of the particle to the substrate can be covalent or electrostatic. From this catalyst pattern, additional structures can be formed, depending on the catalyst material composition and subsequent reaction conditions. For example, in one particular embodiment single-walled carbon nanotubes may be formed at the patterned regions, when the catalyst particles comprising the pattern are composed of a mixture of iron and molybdenum and the reaction conditions are CVD with a carbon-containing feedgas such as CO.

Figure 3:
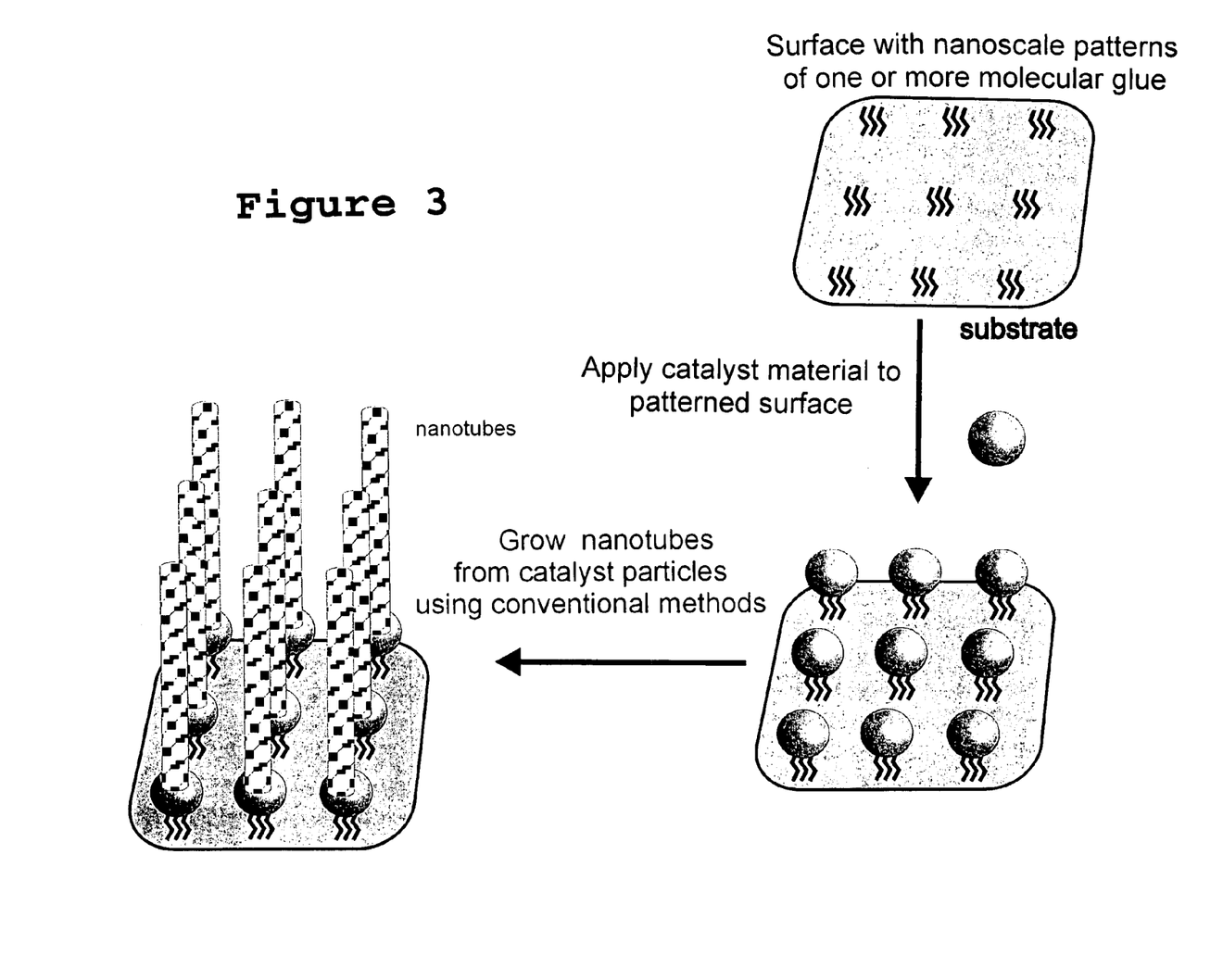
FIG. 3 illustrates an ink-coated AFM tip used to pattern a substrate surface by nanolithography including use of catalyst particles.
Figure 4:
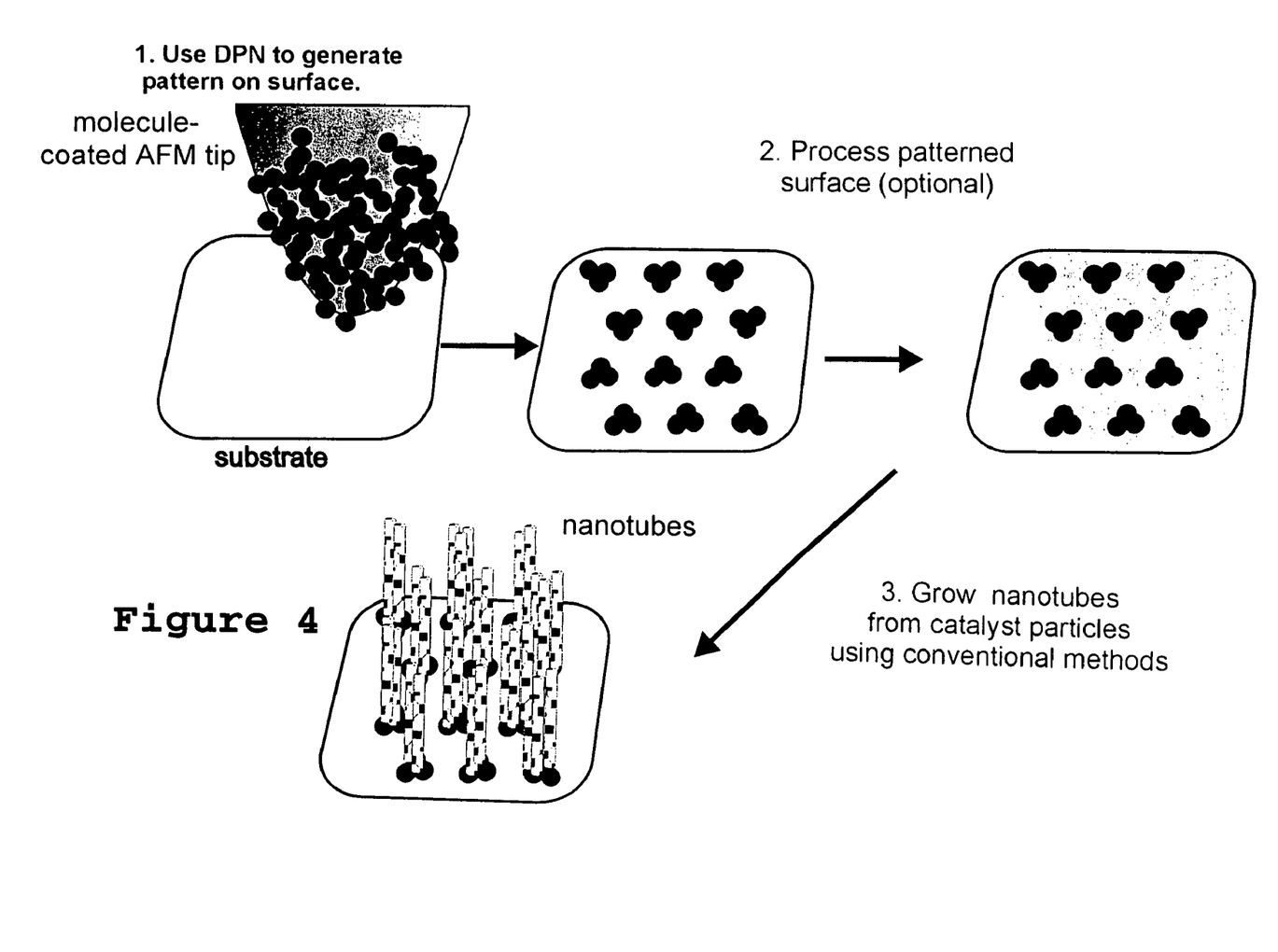
FIG. 4 illustrates an ink-coated AFM tip used to pattern a substrate surface by nanolithography including use of catalyst particles.
Figure 5:
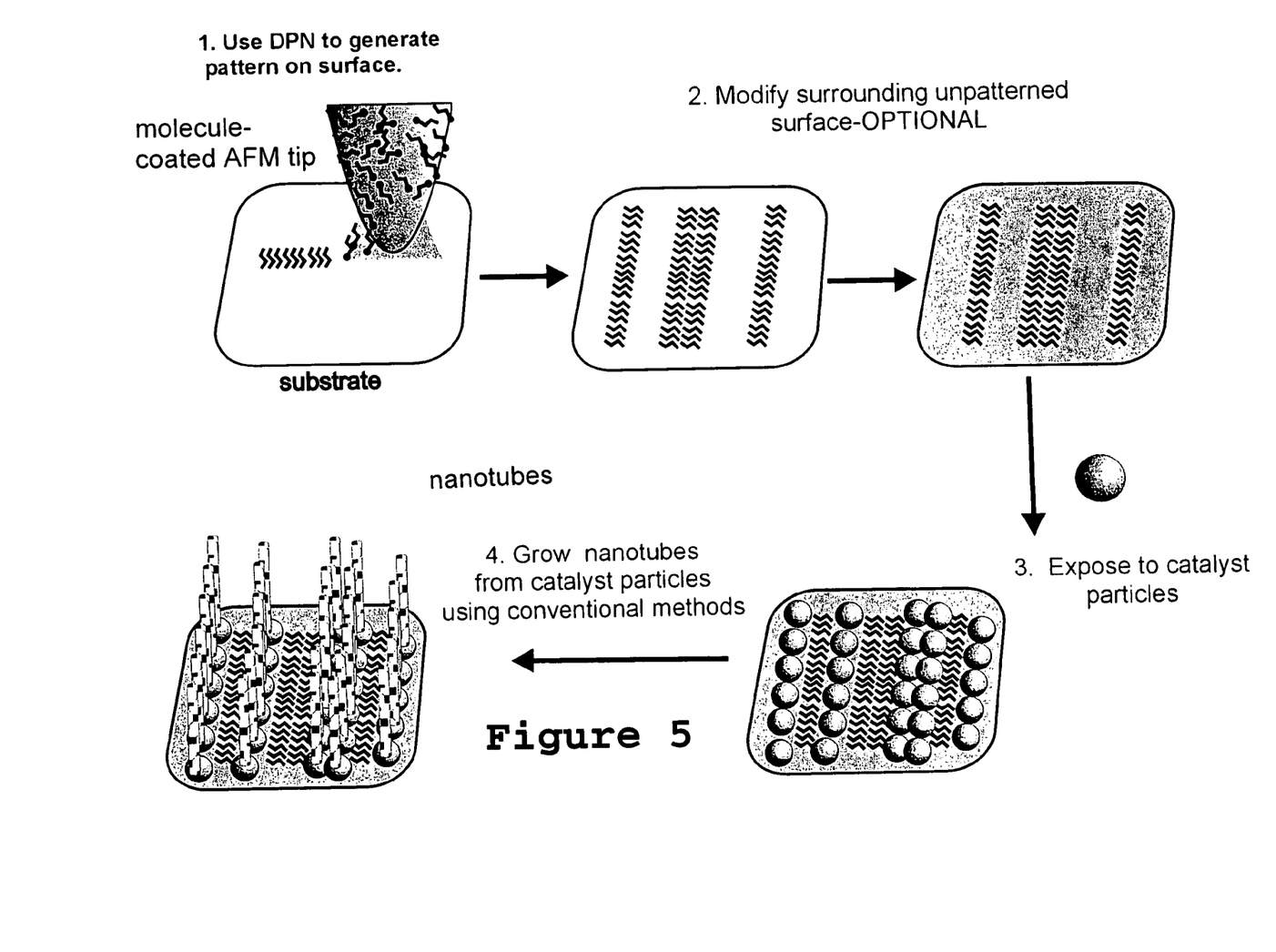
FIG. 5 illustrates an ink-coated AFM tip used to pattern a substrate surface by nanolithography, wherein a negative mode is used so that the deposited pattern resists deposition of catalyst ink.

In FIG. 3, a more general embodiment is illustrated wherein catalyst particles are applied to a patterned surface. A surface of nanoscale patterns is produced using a molecular glue. A catalyst material is applied. From the patterned catalyst, a three dimensional structure is formed such as, for example, a nanotube or nanowire. In another form of this invention, a catalyst precursor material may be applied to the template pattern. The precursor can be converted to an active catalyst in a separate step, for example by application of energy in the form of heat. In an alternative embodiment, preformed catalyst molecules or nanoscale catalyst particles are applied to a substrate directly via DPN printing or another such positive patterning technique. In this case, the catalyst material is in the form of an "ink" which is transferred to the substrate surface as part of the DPN printing process. This direct catalyst deposition is illustrated in FIG. 4. Additionally, surfaces can be patterned in positive and negative modes. In a negative mode, for example, a surface can be patterned to resist deposition of the catalyst ink. In this mode, the catalyst would be preferentially bound to the remainder of the surface as illustrated in FIG. 5.

In the present invention, a wide variety of substrates can be used. DPN printing substrates are disclosed in the above-cited DPN printing references. Substrates can be any material which can be modified by a patterning compound to form stable surface structures. In other words, the DPN printed substrate can be tailored to be chemically bound to the ink transferred to the substrate during DPN printing. The substrate can be, for example, relatively hard, inorganic materials including elemental materials, oxides of the elements, ceramics, metals semiconductors, magnetic materials, polymer or polymer-coated materials, and superconductor materials. These include, for example, silicon, silicon oxide, alumina, quartz, and silicon nitride. The substrate can be flat, non-flat, or curved, although in general a flat substrate is preferred. The substrate can be porous. The substrate can be, for example, a conductor, a semi-conductor, or an insulator. The substrate can be surface treated to improve performance by, for example, improving adhesion.

In addition, the substrate can be, for example, materials and shapes of interest for production of one or more scanning probe microscopic tips, including atomic force microscope tips and electrostatic force microscopy probe tips. The materials can be, for example, silicon and silicon nitride, microfabricated in the shapes of cantilevers with integrated pyramidal tips. Such tips are disclosed, for example, in the paper by Cheung et al. (*Proc. Nat'l Acad. Sci.*, Apr. 11, 2000, vol. 97, no. 8, 3809–3813), which is incorporated by reference. Also, U.S. patent publication 20020046953 to Lee et al., published Apr. 25, 2002, discloses tips and related methods of fabricating tips, and is incorporated by reference. Another class of suitable substrates can be, for example, surfaces containing microfabricated structures of interest for production of sensors, field emission sources, or other optical or electronic devices.

Specific examples of preformed catalyst or catalyst precursor materials include nanoparticles having dimensions ranging from several microns to several nanometers. The particles can be polymeric, metals, semiconductors or insulators. The catalyst can be transition metal catalysts including, for example, Fe, Ni, Mo, and Co, or other metals such as, for example, titanium, platinum, and palladium. Catalysts can also be mixtures of metals, such as Fe/Mo. Composite nanostructures can be, for example, aluminum oxide, silicon oxide, tin oxide, and iron oxide. In preferred embodiments, the catalyst can be, for example, iron oxide ($Fe_2O_3$), iron, molybdenum, cobalt, nickel, ruthenium, or zinc, and oxides thereof. The catalytic regions or islands can be also formed from thermal decomposition of metallic salts. For example, iron (III) nitrate can be oxidatively decomposed into iron (III) oxide. Catalysts with magnetic properties can be used including, for example, magnetic iron oxide. In addition, supported catalysts can also be used such as, for example, alumina-supported iron. Specific examples include inactive particles (such as polystyrene, titanium dioxide, alumina, silica) which act as supports for the catalytic particles. Catalysts are described in, for example, U.S. Pat. No. 6,346,189 including supported and unsupported catalyst particles.

An advantage of the DPN process is the ability to form closely spaced nanometer level structures. The distance between separated catalyst regions can be on the many micron scale or as small as 5 nm, or can be the minimum inter-feature distance achieved with DPN printing. Thus, multiple catalyst materials can be patterned using this method, including two or more catalyst components, with each component in discrete patterns. Thus, combinatorial arrays of catalyst materials can be produced.

The catalyst region can have a length or width dimension, other than height, which is less than about one micron in size, more particularly less than about 500 nm in size, more particularly less than about 250 nm in size, more particularly less than about 100 nm in size, more particularly less than about 50 nm in size, and more particularly less than about 25 nm in size. The catalyst region can have a length or width dimension, other than height, which is at least about 1 nm in size, more particularly, which is at least about 5 nm in size.

The DPN printing can be carried out with a reactive transfer of ink to the substrate, or with non-reactive transfer of ink to the substrate.

The catalyst pattern can be a series of patterned catalyst dots, or can be a series of patterned catalyst lines.

Once patterned, the catalyst regions or islands can be used to grow electrically conductive, semiconducting, or insulating structures from the catalyst. The resulting structures can be, for example, nanotubes, nanowires, or mixtures thereof, and may include carbon nanotubes, Si or Ge crystalline nanowires, cobalt nanowires, various sulfides, oxides, and nitrides, for example silicon nitride, copper sulfite, silicon oxide.

In one embodiment, carbon structures can be fabricated from the patterned catalysts including fullerenes, nanohorns, and carbon nanotubes. The carbon structures can be conductive or semi-conductive doped nanotubes, or mixtures thereof. The nanotubes can be single-walled, double walled, or multi-walled nanotubes. The nanotubes can be in the form of fibrils and ropes.

Carbon nanotubes can be generated by methods known in the art with use of carbon sources such as, for example, methane, carbon monoxide, acetylene, or ethylene.

Instrumentation is available from, for example, NanoDevices (Santa Barbara), for growing carbon nanotubes by catalyzed chemical vapor deposition (EASYTUBE™ NANOFURNACE).

Documents which are incorporated by reference, and which relate to nanotube technology, including CVD fabrication and catalysis, applications of carbon nanotubes in devices, purification of nanotubes once formed, and which can be used to in practicing the present invention include:
(1) Hannes Kind et al. *Advanced Materials*, 1999, 11, 1285.
(2) Y. Y. Wei et al. *J. Vac. Sci. Technol. B*, 2000, 18(6), 3586
(3) H. Wang et al. *Applied Surface Science*, 2001, 181, 248–254.
(4) Chin Li Cheung, *PNAS*, 2000, 97(8), 3809–3813.
(5) J. H. Hafner, *J. Am. Chem. Soc.*, 1999, 21, 9750–9751.
(6) Cao et al. *Applied Surface Science*, 2001, 181, 234–238.
(7) Dai et al., "Growth and Characterization of Carbon Nanotubes," book chapter in "Topics in Applied Physics", Vol. 80, Ed. M. Dresselhaus, Springer Verlag (2000).
(8) Dai et al. Appl. Phys. Lett., 75, 3566–3568 (1999).
(9) Dai et al. J. Am. Chem. Soc., 121 7975–7976 (1999).
(10) Dai et al. Phys. Chem., 103, 6484–6492 (1999).
(11) Dai et al. Appl. Phys. Lett., 627–629, 75 (1999).
(12) Dai et al. Science, 283, 512 (1999).
(13) Dai et al. Nature, 395, 878,(1998).
(14) M. S. Dresselhaus et al., *Science of Fullerenes and Carbon Nanotubes*, Academic Press, San Diego, 1996.
(15) Li et al, Chem. Mater., 13, 1008–1014,(2001).
(16) U.S. Patent Publication, 2003/0148577 ("Controlled Alignment of Catalytically Grown Nanostructures in a Large Scale Synthesis Process") by Merkulov et al., published Aug. 7, 2003.

(17) U.S. Patent Publication 2002/0127336, published Aug. 1, 2002 to Richard Smalley et al.
(18) U.S. Patent Publication 2002/0113714, published Aug. 1, 2002 to Richard Smalley et al.
(19) U.S. Patent Publication 2002/0102203, published Aug. 1, 2002 to Richard Smalley et al.
(20) U.S. Pat. No. 6,183,714 ("Method of Making Ropes of Single-Wall Carbon Nanotubes") to Richard Smalley et al., issued Feb. 6, 2001.
(21) U.S. Patent Publication 2002/0088938 to Colbert et al., published Jul. 11, 2002 ("Methods for forming an array of single-wall carbon nanotubes and compositions thereof").
(22) U.S. Patent Publication 2003/0143327, published Jul. 31, 2003 to Rudiger et al.
(23) U.S. Pat. No. 6,146,227 to Mancevski issued Nov. 14, 2000 (Method for manufacturing carbon nanotubes as functional elements of MEMS devices").
(24) U.S. Pat. No. 6,277,318 to Bower et al., issued Aug. 21, 2001 ("Method for fabrication of patterned carbon nanotube films").
(25) U.S. Pat. No. 6,333,016 to Resasco et al. issued Dec. 25, 2001 ("Method of producing carbon nanotubes").
(26) U.S. Patent Publication 2002/0130353 to Lieber et al., published Sep. 19, 2002 (Nanoscopic wire-based devices, arrays, and methods of their manufacture").

Nanotubes and nanowires, which are preferred embodiments of the present invention, are important materials because of their unique mechanical and electrical properties. In this invention, nanotubes and nanowires can be positioned on substrates with high resolution, on the order of many microns to several nanometers. Growth can extend in a direction perpendicular to the substrate, or can extend more laterally. In lateral growth, the possibility exists for connection between different catalyst regions, or between a catalyst and a non-catalytic region. In this embodiment, circuits can be formed. The circuits may act as components in sensors, biosensors, and other nanoelectronic devices. Other applications of such structures are in field emission sources and photonics, as well as others noted in the above-cited references.

The carbon nanotube length can vary greatly depending on how they are made, and can be nanoscopic or microscopic. The aspect ratio can be, for example, about 100 to about 100,000, more particularly, 100 to 10,000.

Preferred Embodiments

A. An Example of a Fabrication Method for Nanostructures Described Above.

Method used for generating gold surfaces with nanoscale carbon nanotube patterns via dip pen nanolithographic printing.
1. Monodispersed Fe/Mo particles (14 nm) are prepared by thermal decomposition of $Fe(CO)_5$ and $Mo(CO)_6$ by refluxing in octyl ether solvent in the presence of surfactants octanoic acid and/or bis-2-ethylhexylamine (as described by Li et al *Chem. Mater.*, 2001, 13, 1008–1014.)
2. Patterns of 16-mercaptohexadecanoic acid are generated via Dip Pen Nanolithography on a polycrystalline gold substrate (60 nm of Au thermally evaporated onto a 5 nm thick Ti adhesion layer). Typically, patterns of dots and lines are generated with lateral feature dimensions on the order of microns down to 50 nm. After patterning the template molecule, the unpatterned gold surface is protected by exposure to a 1 mM solution of 1-octadecanethiol in ethanol for 10 min., then rinsed with ethanol.
3. After generation of the template pattern, the substrate is exposed to a solution of the Fe/Mo nanoparticles in n-heptane for 0.5 h. The substrate is then rinsed carefully with n-heptane to remove any particles that are not bound to the template pattern.
4. The catalyst patterned substrate is then heated to 700° C. in air to remove organic coatings on the particles.
5. Single-walled carbon nanotubes are grown from the catalyst regions via CVD using a high temperature furnace setup with $H_2$/CO feedgas (described by Zheng et al, *Nano Letters,* 2002, Vol. 2, No. 8, 895–898.)

B. An Example of a Fabrication Method for Nanostructures Described Above.

Method used for generating insulator or semiconductor (silicon or silicon oxide) with nanoscale carbon nanotube patterns via dip pen nanolithography.
1. Monodispersed Fe/Mo particles (3 nm) are prepared by thermal decomposition of $Fe(CO)_5$ and $Mo(CO)_6$ by refluxing in octyl ether solvent in the presence of surfactants octanoic acid and/or bis-2-ethylhexylamine (as described by Li et al *Chem. Mater.*, 2001, 13, 1008–1014.)
2. Patterns of 3-aminopropyltrimethoxysilane are generated via dip pen nanolithography on a silicon/silicon oxide substrate (500 nm of thermally grown oxide on silicon). Typically, patterns of dots and lines are generated with lateral feature dimensions on the order of microns down to 10 nm.
3. After generation of the template pattern, the substrate is exposed to a solution of the Fe/Mo nanoparticles in n-heptane for 0.5 h. The substrate is then rinsed carefully with n-heptane to remove any particles that are not bound to the template pattern.
4. Carbon nanotubes are grown from the catalyst regions as described above.

C. An Example of a Fabrication Method for Nanostructures Described Above.

Method used for generating insulator or semiconductor (silicon or silicon oxide) with nanoscale carbon nanotube patterns via dip pen nanolithography.
1. Monodispersed Fe/Mo particles (3 nm) are prepared by thermal decomposition of $Fe(CO)_5$ and $Mo(CO)_6$ by refluxing in octyl ether solvent in the presence of surfactants octanoic acid and/or bis-2-ethylhexylamine (as described by Li et al *Chem. Mater.*, 2001, 13, 1008–1014.)
2. Patterns of catalyst particles are generated via dip pen nanolithography on a silicon/silicon oxide substrate (500 nm of thermally grown oxide on silicon). Typically, patterns of dots and lines are generated with lateral feature dimensions on the order of microns down to 10 nm.
3. Carbon nanotubes are grown from the catalyst regions as described above.

D. An Example of a Fabrication Method for Nanostructures Described Above.

Method used for generating gold surfaces with nanoscale carbon nanotube patterns via dip pen nanolithographic printing.
1. Monodispersed Fe/Mo particles (14 nm) are prepared by thermal decomposition of $Fe(CO)_5$ and $Mo(CO)_6$ by refluxing in octyl ether solvent in the presence of surfactants octanoic acid and/or bis-2-ethylhexylamine (as described by Li et al *Chem. Mater.*, 2001, 13, 1008–1014.)
2. Patterns of 1-octadecanethiol are generated via Dip Pen Nanolithography on a polycrystalline gold substrate (60 nm of Au thermally evaporated onto a 5 nm thick Ti adhesion layer). Typically, patterns of dots and lines are generated with lateral feature dimensions on the order of microns down to 50 nm. After patterning the resist molecule, the unpatterned gold surface is modified with 16-mercaptohexadecanoic acid by exposure to a 1 mM solution in ethanol for 10 min., then rinsed with ethanol.
3. After generation of the negative pattern, the substrate is exposed to a solution of the Fe/Mo nanoparticles in n-heptane for 0.5 h. The particles bind selectively to the regions consisting of 16-mercaptohexadecanoic acid, and do not bind to the regions containing 1-octadecanethiol. The substrate is then rinsed carefully with n-heptane to remove any particles that are not bound to the 16-mercaptohexadecanoic acid regions.
4. The catalyst patterned substrate is then heated to 700° C. in air to remove organic coatings on the particles.
5. Single-walled carbon nanotubes are grown from the catalyst regions via CVD using a high temperature furnace setup with $H_2$/CO feedgas (described by Zheng et al, *Nano Letters,* 2002, Vol. 2, No. 8, 895–898.)

E. Additional Preferred Embodiment

The useful properties of single-walled carbon nanotubes are generally understood to be a function of their diameter and chirality. It is generally understood, for example, that the diameter of SWNTs produced from metal oxide catalyst particles can be related to the diameter of the catalyst nanoparticle. Therefore, a need exists to control the size of the deposited catalyst particles. The following embodiments of DPN printing can be used to pattern discreet packages of catalyst material using a carrier. A carrier can be used to closely control the diameter of the resulting particle, and thus the diameter of the SWNT produced.

A carrier can be, for example, a synthetic or biological polymer including a dendrimer or a protein carrier such as, for example, ferritin. Dendrimer carriers are described in, for example, H. C. Choi et al., *J. Phys. Chem. B.*, Vol. 106, No. 48, Dec. 5, 2002, pages 12361–12365, which is hereby incorporated by reference in its entirety. DPN printing of dendrimers is described in, for example, R. McKendry et al., *NanoLetters,* 2002, Vol. 2, No. 7, pages 713–716, which is hereby incorporated by reference in its entirety. Proteins having cores and metal carrier ability can be used. For example, use of cores of the iron-storage protein ferritin is described in, for example, Y. Li et al., *J. Phys. Chem. B.,* 2001, 105, 11424–11431. In this embodiment, small iron particles of about 1 nm to about 5 nm in diameter can be used to prepare single tubes.

E1. Artificial Protein Carriers for Iron Deposition Via the DPN Printing Process.

Method used for generating silicon oxide surfaces with SWNTs with well defined diameters via dip pen nanolithographic printing.
1. Apoferritin molecules (available from Sigma-Aldrich) are reconstituted with Fe(III) using standard procedures (see Li et al *J. Phys. Chem. B* 2001 reference, for example, cited above).
2. Different sizes of final catalyst particles can be made by controlling the amount of iron in the ferritin. The loading of ferritin with controllable amount of iron yields iron oxide particles with well defined diameters and narrow size distributions, for example, ~200 iron atoms yield about 1.9 nm diameter particles, while 1100 iron atoms yield about 3.7 nm diameter particles.
3. The iron-loaded protein, dissolved in distilled water is used as ink for patterning nanoscale features on a substrate via the DPN printing process. Protein printing is described in, for example, U.S. patent application Ser. No. 10/442,189 filed May 21, 2003 to Mirkin et al. which is hereby incorporated by reference.
4. Following patterning, the substrate is heated to 800° C. in air to remove the organic layer and to obtain fully oxidized iron catalyst particles.
5. Single-walled carbon nanotubes are grown from the catalyst regions via CVD using a high temperature furnace setup with $H_2$/CO feedgas (described by Zheng et al, *Nano Letters,* 2002, Vol. 2, No. 8, 895–898.)

E2. Dendrimer Carriers for Iron Deposition Via the DPN Printing Process.

Method used for generating silicon oxide surfaces with SWNTs with well defined diameters via dip pen nanolithographic printing.
1. Dendrimer molecules (hydroxyl terminated PAMAM G6 available from Dendritech) are loaded with Fe(III) using standard procedures (Li et al *J. Phys. Chem. B* 2001, cited above).
2. The iron-containing dendrimers dissolved in an aqueous solution are used as the ink to form nanoscale patterns on a substrate via the DPN printing process.
3. Following patterning, the substrate is heated to 800° C. in air to remove the organic dendrimer and yield fully oxidized iron catalyst particles.
4. Single-walled carbon nanotubes are grown from the catalyst regions via CVD using a high temperature furnace setup with $H_2$/CO feedgas (described by Zheng et al, *Nano Letters,* 2002, Vol. 2, No. 8, 895–898.)

E3. Dendrimer Carriers for Iron Deposition Via the DPN Process.

Method used for generating silicon oxide surfaces with SWNTs with well defined diameters via dip pen nanolithographic printing.
1. Dendrimers (hydroxyl terminated PAMAM G6 available from Dendritech) dissolved in an aqueous solution are used as the ink to form nanoscale patterns on a substrate via the DPN printing process.
2. Following patterning, the substrate is exposed to an aqueous solution of $FeCl_3$ ($6H_2O$) for several seconds to fully load the dendrimers with Fe(III). The substrate is briefly rinsed to remove uncomplexed iron.
3. Following patterning, the substrate is heated to 800° C. in air to remove the organic dendrimer and yield fully oxidized iron catalyst particles.
4. Single-walled carbon nanotubes are grown from the catalyst regions via CVD using a high temperature furnace setup with $H_2$/CO feedgas (described by Zheng et al, *Nano Letters,* 2002, Vol. 2, No. 8, 895–898.)

While the invention has been described above with particularity, other embodiments will be known to those skilled in the art which are not expressly disclosed herein but nevertheless form part of the invention. In the present invention, what can be claimed is:

What is claimed is:

1. A method for producing carbon nanotubes, the method comprising:
    a) providing a substrate with a top surface,
    b) forming an island of catalyst material on the top surface using a tip having a patterning compound thereon,
    c) heating the substrate and catalyst island, and
    d) contacting the catalyst island with a carbon-containing gas for a period of time sufficient to form the nanotubes on the catalyst island.

2. The method according to claim 1, wherein the tip is a scanning probe microscopic tip.

3. The method according to claim 1, wherein the tip is an atomic force microscopic tip.

4. The method according to claim 1, wherein the island has a length or width dimension other than height which is less than about one micron in size.

5. The method according to claim 1, wherein the island has a length or width dimension other than height which is less than about 100 nm in size.

6. The method according to claim 1, wherein the island is a dot.

7. The method according to claim 1, wherein the island is a line.

8. The method according to claim 1, wherein the island has a length or width dimension other than height which is less than about one micron in size and the tip is an AFM tip.

9. The method according to claim 8, wherein the island has a length or width dimension other than height which is less than about 100 nm.

10. The method according to claim 9, wherein the substrate top surface is also passivated.

11. A method for producing carbon nanotubes comprising the steps of:
    a) providing an ink-coated AFM tip, wherein the ink comprises a catalyst for carbon nanotube growth;
    b) forming a pattern of catalyst on the top surface of a substrate with use of direct-write nanolithography using the ink-coated AFM tip, wherein the pattern is characterized by a size dimension other than height which is less than about one micron; and
    c) contacting the catalyst with a carbon-containing gas under conditions sufficient to form the carbon nanotubes on the catalyst.

12. The method according to claim 11, wherein the dimension is less than about 100 nm.

13. The method according to claim 11, wherein the catalyst is a nanoparticle.

14. The method according to claim 11, wherein the catalyst is a metallic or metallic oxide nanoparticle.

15. The method according to claim 11, wherein the pattern comprises an array of dots.

16. The method according to claim 11, wherein the pattern comprises an array of lines.

17. A method for producing carbon nanotubes comprising the steps of:
    a) providing an ink-coated AFM tip, wherein the ink comprises a catalyst precursor for carbon nanotube growth;
    b) forming a pattern of catalyst precursor on the top surface of a substrate with use of direct-write nanolithography using the ink-coated AFM tip, wherein the pattern is characterized by a size dimension other than height which is less than about one micron;
    c) converting the catalyst precursor to catalyst;
    d) contacting the catalyst with a carbon-containing gas under conditions sufficient to form the carbon nanotubes on the catalyst.

18. The method according to claim 17, wherein the catalyst is a metal or metal oxide.

19. The method according to claim 17, wherein the dimension is about 100 nm or less.

20. The method according to claim 17, wherein the catalyst is a metal or metal oxide and the dimension is about 100 nm or less.

21. The method according to claim 17, wherein the catalyst precursor comprises a polymeric carner.

22. The method according to claim 17, wherein the catalyst precursor comprises a dendrimer or protein.

23. A method for producing carbon nanotubes comprising the steps of:
    a) providing an ink-coated AFM tip,
    b) forming a template pattern on the top surface of a substrate with use of direct-write nanolithography using the ink-coated AFM tip, wherein the pattern is characterized by a size dimension other than height which is less than about one micron;
    c) binding carbon nanotube catalyst to the pattern;
    d) contacting the catalyst with a carbon-containing gas under conditions sufficient to form the carbon nanotubes on the catalyst.

24. The method according to claim 23, wherein the carbon nanotube catalyst is a metal or metal oxide.

25. The method according to claim 23, wherein the dimensions is less than about 100 nm.

26. The method according to claim 23, wherein the carbon nanotube catalyst is a metal or metal oxide and the dimensions is less than about 100 nm.

27. A method for producing carbon nanotubes comprising the steps of:
    a) providing an ink-coated AFM tip,
    b) forming a template pattern on the top surface of a substrate with use of direct-write nanolithography using the ink-coated AFM tip, wherein the pattern is characterized by a size dimension other than height which is less than one micron;
    c) binding carbon nanotube catalyst precursor to the pattern;
    d) converting the catalyst precursor to a catalyst;
    e) contacting the catalyst with a carbon-containing gas under conditions sufficient to form the carbon nanotubes on the catalyst.

28. The method according to claim 27, wherein the catalyst is a metal or metal oxide.

29. The method according to claim 27, wherein the dimensions is less than about 100 nm.

30. The method according to claim 27, wherein the catalyst is a metal or metal oxide and the dimensions is less than about 100 nm.

31. A method for producing nanotubes or nanowires consisting essentially of the steps of:
    a) forming a catalyst pattern on the top surface of a substrate with use of direct-write nanolithgraphic printing without use of a resist or a stamp and a scanning probe microscope tip having a patterning ink thereon, wherein the catalyst is bonded to the substrate, and
    b) contacting the catalyst with a gas under conditions sufficient to form the nanotubes or nanowires on the catalyst, wherein the catalyst pattern is characterized by a size dimension other than height which is less than about 500 nm.

32. The method according to claim 29, wherein the dimension is less than about 100 nm.

33. The method according to claim 29, wherein the catalyst is a metal or metal oxide.

34. The method according to claim 29, wherein the nanotubes or nanowires consist essentially of carbon.

35. The method according to claim 31, wherein the catalyst is formed directly on the surface without use of a precursor.

36. The method according to claim 31, wherein the catalyst is formed indirectly on the surface with use of a precursor ink which is converted to catalyst after patterning.

37. A method for producing carbon nanotubes comprising the steps of:
   a) providing an ink-coated AFM tip, wherein the ink comprises a dendrimer;
   b) forming a pattern of dendrimer on the top surface of a substrate with use of direct-write nanolithography using the ink-coated AFM tip, wherein the pattern is characterized by a size dimension other than height which is less than about one micron;
   c) loading patterned dendrimer with (i) catalyst, or (ii) catalyst precursor followed by conversion to catalyst, and
   d) contacting the catalyst with a carbon-containing gas under conditions sufficient to form the carbon nanotubes on the catalyst.

* * * * *